June 2, 1964  A. P. SCHELLER ET AL  3,135,850
OVERLAND PIPE WELDING MACHINE

Filed Dec. 12, 1961   6 Sheets-Sheet 1

INVENTORS
ARTHUR P. SCHELLER
HOWARD R. MILLER
RALPH P. PHILLIPS

BY Barnwell R. King
ATTORNEY

June 2, 1964 A. P. SCHELLER ET AL 3,135,850

OVERLAND PIPE WELDING MACHINE

Filed Dec. 12, 1961 6 Sheets-Sheet 5

INVENTORS
ARTHUR P. SCHELLER
HOWARD R. MILLER
RALPH P. PHILLIPS.

BY Barnwell P. King
ATTORNEY

INVENTORS
ARTHUR P. SCHELLER
HOWARD R. MILLER
RALPH P. PHILLIPS

BY Barnwell P. King
ATTORNEY

United States Patent Office 3,135,850
Patented June 2, 1964

3,135,850
OVERLAND PIPE WELDING MACHINE
Arthur P. Scheller, Chatham, Howard R. Miller, Clark, and Ralph P. Phillips, Newark, N.J., assignors to Union Carbide Corporation, a corporation of New York
Filed Dec. 12, 1961, Ser. No. 158,720
7 Claims. (Cl. 219—60)

This invention relates to gas-shielded consumable electrode work-in-circuit electric arc welding, and more particularly to a sigma (shielded-inert-gas-metal-arc-flux) pipe welding machine.

In making circumferential joints in the past an entire welding apparatus was placed alongside the junction of two stationary abutting ends of pipe, so that the welding carriage and head assembly could traverse circumferentially about the joint to make the weld. Such apparatus was sufficiently portable that it could be simply removed from the completed weld and relocated on the next joint.

To promote such operation, a basic transport carriage capable of handling a suitable welding head assembly was utilized. The carriage, consisting of an electric drive motor mounted upon a suitable frame with contact rollers to travel about the pipe, was held in intimate contact with the pipe by two easily detachable chain assemblies.

While such carriage could be made to travel about the pipe in closely controlled proximity, it might not necessarily track with sufficient accuracy to closely follow a weld seam. This was so because of inherent variations from true roundness of commercially available pipe.

If a pipe upon which a weld is to be made were not "true" (essentially round), the welding system had no available means for compensating for such deficiency. As a result, the work-to-torch tip distance could vary, yielding a nonuniform weld. Heretofore, manually operated mechanical means such as an internal expanding device, also was necessary to alleviate such difficulty by attempting to true up the pipe. However, this was not a completely reliable method of providing positive alignment.

To compensate for slight variations due to "wander" of the welding head transport carriage transverse to the seam, according to the present invention, means for alignment compensation is interposed between the carriage transport assembly and the welding head assembly. However, in order to guide the floating welding head relative to the weld seam, a separately mounted guide track is also utilized. Such track provides positive means for sensing the relative positions of the welding apparatus and the weld seam, thus maintaining the welding arc within the practical confines of the joint.

Common prior practice in manual welding of pipe has required a joint preparation, wherein a V bevel of sufficient magnitude is used to facilitate the making of an initial root pass. Subsequent filler passes, therefore, were made with a weaving or transverse reciprocating motion of the electrode so as to completely fill the prepared joint. Obviously, such techniques were time consuming and required operators with considerable skill to properly execute the operation.

Heretofore, manual multiple pass welding was about the only method available for welding large overland pipe in position. With such techniques, however, weld results were not uniform and much skill was required to produce sound welds. As a result, an object of this invention is to provide mechanized means capable of producing uniform welds at increased welding rates. An oscillating mechanism, suitably mounted upon the floating welding head frame assembly, in conjunction with the welding head assembly, imparts a controlled transverse motion relative to the forward speed necessary to obtain the desired width and uniformity of the weld.

The main object of this invention is to provide means for keeping the rotating welding head aligned with the seam being automatically welded in large diameter pipe (24 inches in diameter and up).

Another object is to provide an improved method of welding such large pipes in situ which minimizes the personal skill and labor, and increases the efficiency and speed of welding.

According to the invention there is provided a method of sigma-flux welding overland pipe in situ, which comprises upwardly advancing a sigma-flux welding machine first about one-half and then about the other half of an annular V-joint that has previously been stringer- or root-pass and hot pass welded in the pipe, similarly advancing a floating sigma-flux welding head, and guiding said floating head radially and longitudinally of the pipe independently of said machine for the purpose of maintaining the sigma-flux welding operation accurately located at all times with respect to such V-joint as said machine so advances the floating head.

Further, according to the invention there is provided a method of welding overland pipe in situ, which comprises advancing a transversely oscillating sigma-flux welding head about one half of the pipe from about 6 to about 12 o'clock in an annular V-joint that has been previously root pass and hot pass welded, stopping such operation at such 12 o'clock position, removing the resulting light slag from such weld while advancing such transversely oscillating sigma flux welding head about the other half of the pipe from about 6 to about 12 o'clock in such V-joint, and removing the resulting light slag from the weld, the effective amount of flux powder delivered being decreased at about the 2 and 10 o'clock positions, respectively, of such half-passes for the purpose of effectively eliminating adverse flux entrapment in the weld.

The invention also provides apparatus for circumferentially welding overland pipe in situ, which comprises the combination with a main carriage, means for supporting and guiding said carriage on and around such pipe in a direction substantially parallel to the joint to be welded, a motor on said carriage for driving the latter, a separate auxiliary track located annularly on the outer surface of the pipe at a precise distance from such joint in relation to which such track is adjusted in exact parallelism, and a separate welding head carriage. The track comprises an external annular band which assumes the same shape as that of the pipe. An arc welding torch is mounted on said welding head carriage for welding such joint. Pilot means is connected to the welding head carriage and bears on the band for causing said track to guide the welding head carriage so that said torch always is in proper welding position with respect to such joint, while the carriages are connected so that the welding head carriage is free to float longitudinally as well as radially of the pipe while being driven in an annular direction about the pipe by said main carriage, thereby maintaining the welding torch in the proper position for welding such joint at all times irrespective of any wobbling of the main carriage during the arc welding operation.

Figure 1:
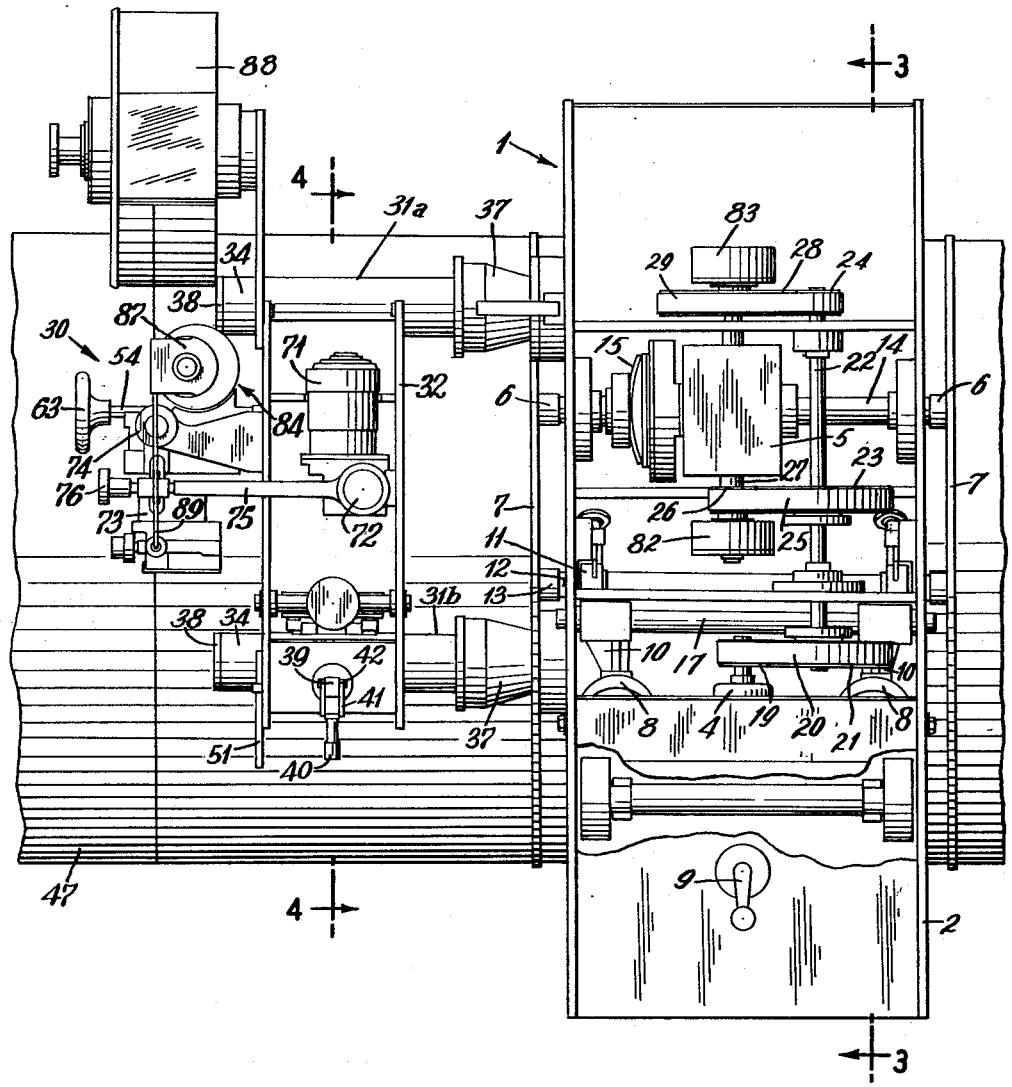
FIG. 1 is a plan view of an overland pipe welding machine illustrating the invention.

A carriage transport assembly 1, is used to convey the welding head assembly 30 about a pipe 47. Such carriage transport assembly 30 includes a frame 2 provided with four wheels 3, a drive motor 4, gear reduction box or unit 5. Such unit 5 operates two drive sprockets 6 that engage circumferential chains 7, through a shaft 14 and a torque limiter 15. In addition, there is provided a chain tensioning system comprising two air cylinders 8, three way valve 9, rocker arms 10, sliding bearings 11, shaft 12 and tensioning sprockets 13.

Between the drive motor 4 and gear reduction unit 5 there is provided a system of drive pulleys, belts, and clutches for transmitting power from the motor 4 to the gear box 5 at two selectable speed ratios. This system provides a high speed range for positioning or indexing the machine downwards from the top of the pipe in those cases where it is desired to start welding at any point other than at the top of the pipe, as well as a low speed range for welding utilizing the full power of the drive motor. The motor speed is controlled for each range by means of an electronic governor.

The output of drive motor 4 is transmitted from a pulley 19 through belt 20 to pulley 21 on jack shaft 22, which in turn drives pulleys 23 and 24. Pulley 23 is connected by belt 25 to pulley 26 which is free to turn on the rear extension of worm shaft 27 of gear reduction unit 5. Pulley 24 is coupled to a pulley 28 through belt 29 which turns on the forward extension of worm shaft 27. When high speed gearing is used to position the machine, clutch 82 is engaged, coupling pulley 26 to worm shaft 27. At the same time, clutch 83 is disengaged so that pulley 28 is not mechanically locked on worm shaft 27. The relative sizes of pulleys 19, 21, 23, and 26 are such as to produce the desired speed range for indexing the machine on the pipe. Similarly, when clutch 82 is disengaged so that pulley 26 is disconnected from worm shaft 27, and clutch 83 is engaged so that pulley 28 drives worm shaft 27, the size ratio of pulleys 19, 21, 24, and 28 is such as to provide the desired range of welding speeds.

Between the output shaft 14 of gear reduction unit 5 and the drive sprockets 6 is located a torque limiter 15. This torque limiter 15 is preset to slip if the torque imposed between the circumferential hold-down chains 7 and drive sprockets 6 exceeds a maximum value. This protects the gear reduction unit 5 from shock loads that might otherwise damage the gears.

The carriage transport assembly 1 traverses about the circumference of the pipe 47 in the following manner. The two drive sprockets 6 engage the circumferential chains 7 which are flexibly and readily looped about the pipe 47. These chains maintain intimate contact between wheels 3 of carriage transport assembly 1 and pipe 47 for all positions of rotation of the carriage about the pipe. In addition, the chains impart the tractive drive relative to the carriage about the pipe. The two drive sprockets 6, when driven by the drive motor 4 through gear reduction unit 5, impart relative motion between circumferential chains 7 and carriage transport assembly 1. The chains do not move relative to the pipe, but rather the entire carriage transport assembly movement is relative to that of the chains.

A novel chain tensioning system is provided to hold the four wheels 3 of carriage transport assembly 1 in intimate contact with pipe 47. When the machine is mounted on the pipe, and circumferential chains 7 are looped about the pipe and over drive sprockets 6 and tensioning sprockets 13, and their ends are reconnected by means of hook-links, air is admitted to air cylinders 8 through the three-way valve 9. Air pressure drives piston rods 16 down, rotating rocker arms 10 about their pivot shafts 17, which force sliding bearings 11 to ride upwards in their respective slides 18. This motion is transferred through shaft 12 to tensioning sprockets 13, which action pulls the circumferential chains 7 taut. Since each sliding bearing 11 is of the self-aligning type, the shaft 12 may assume a slight angular displacement from the horizontal due to minor differences in the stretched lengths of the two circumferential chains 7, thus maintaining equal tension on both chains.

When it is desired to operate the machine on a pipe which is of different nominal diameter from that for which it has been set up, different sets of circumferential chains 7 are provided to accommodate such different pipe sizes. In addition, it may also be desirable to adjust the spatial relationship between the front and rear pairs of wheels 3 in order to maintain the axis of the torch normal to the surface of the pipe. These pairs of wheels, together with their respective axles, are mounted on brackets that are fastened to the underside of frame 2 in such a manner that they can be readily removed and relocated as may be required to accommodate a particular pipe size.

One other important feature associated with carriage transport assembly 1 is that the wheels 3, being conductive, serve as the electrical pickup for the welding power supply ground connection. This eliminates the requirement of connecting the power supply ground cable directly onto the pipe each time the machine is moved to the next joint. The welding power flows directly through wheels 3 and their bearings to the pipe, through the welding arc, the wire electrode and back to the source as the wheels roll on the outer surface of the pipe as the weld is being made.

Figure 9:
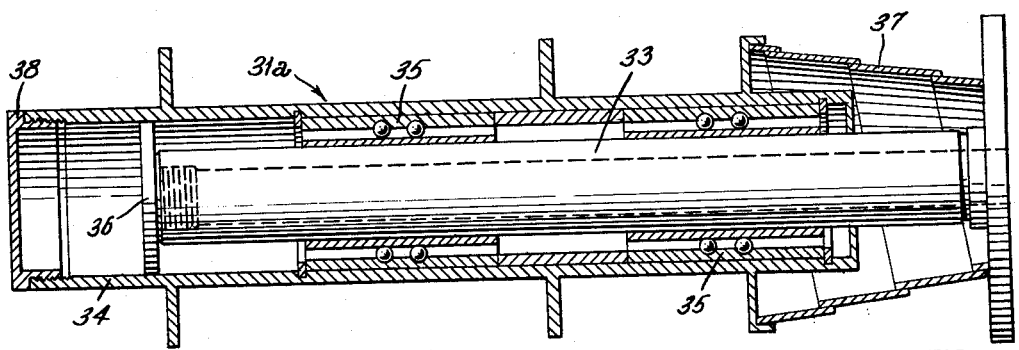
FIG. 9 is a view mainly in longitudinal cross section of the "float" assembly.

Two "float" compensating parallel arm assemblies 31a and 31b are attached to one side of the carriage transport assembly 1 to support the welding head assembly 30 and permit alignment of the welding operation with the weld seam. For such purposes a frame assembly 32 is fixed to radial arm 31a. The construction of arm assembly 31a, as shown in FIG. 9, includes an arm 33 which is rigidly attached to the carriage transport assembly 1, and a sleeve 34 circumferentially disposed about the arm 33 by means of ball-type roller bushings 35. This permits the sleeve 34 to float axially as well as to rotate about arm 33. Axial movement is limited by the length of the arm 33 and sleeve 34 is retained by cap 36. The sleeve 34 is sealed by a conical, telescopic, spirally wound flat spring shield 37 and end cover 38 in order to exclude foreign matter from the arm 33 and bushings 35, respectively.

Figure 2:
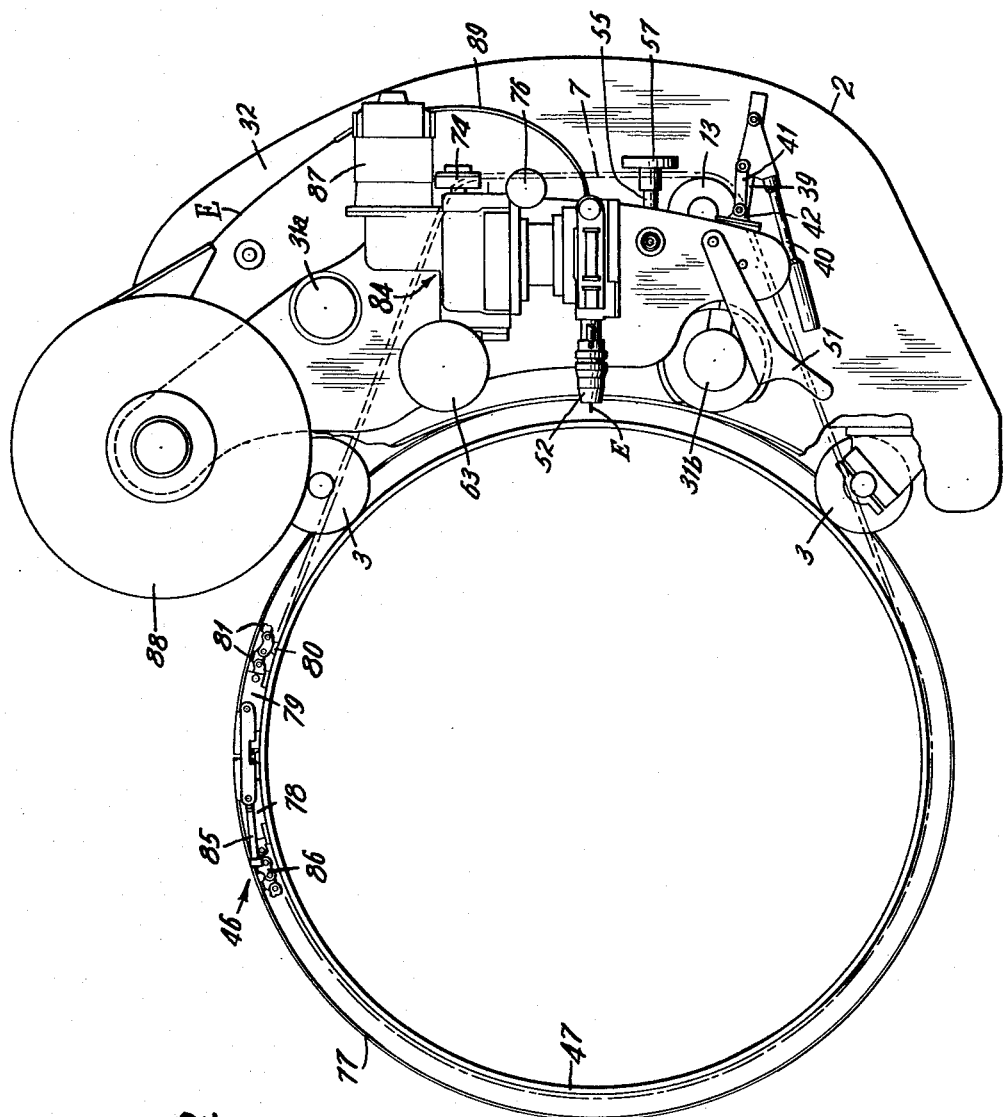
FIG. 2 is a view in end elevation of such machine.
Figure 3:
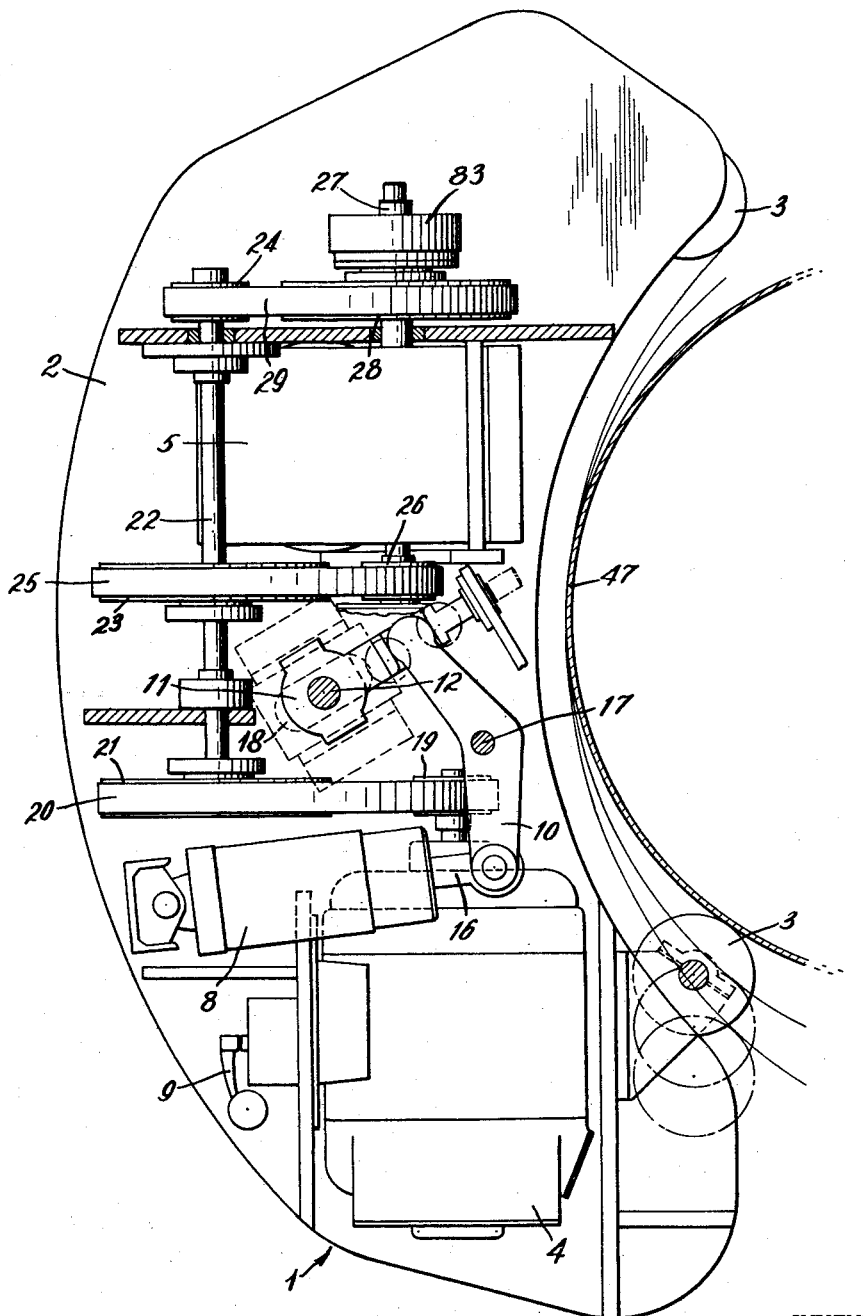
FIG. 3 is a fragmentary sectional view of the carriage transport assembly taken along line 3—3 of FIG. 1.

Arm 31b is similarly constructed and is inter-connected to welding head carrier frame 32 by means of a spring loaded assembly as shown in FIGS. 1 and 2. This assembly includes an extension bar 39, FIG. 2, rigidly attached to arm 31b which in turn is pinned to a tensioning lever 40. A toggle link 41 connects lever 40 to a spring cap sleeve 42 which slides over extension bar 39. The sleeve 42 is interconnected to the carrier frame 32 by means of the spring 43, FIG. 4a, and is preloaded by a sleeve 42 and snap ring 44. When tensioning lever 40 is pressed down in the position shown in FIGS. 2 and 4a, the sleeve 42 is moved down relative to arm 39 and compresses spring 43 against frame 32. In so doing, the frame 32 pivots about arm 31a and the thrust force so imparted is resisted by virtue of a spring loaded carriage pilot or track follower assembly 45 which engages track 46, FIGS. 5 and 6, attached to pipe 47. The maximum value of the spring force required is determined by that force which is necessary to overcome the mass of the complete welding head assembly 30, FIG. 1, when suspended at the lowermost position of the pipe 47. Tension on spring 43 is initially adjusted to overcome the weight of welding head assembly 30 by the amount extension bar 39 is threaded into receiving socket 49 on float arm 31b. Once adjusted, extension bar 39 is locked in place by a locknut 48.

When it is desired to remove the machine from the pipe, the spring force is released by raising lever 40, unlocking toggle link 41. Frame assembly 32 which floats on arm 31a, is lifted from the track 46 by means of sleeve 42, snap ring 44, and washer 50 engaging the underside of frame 32.

Lifting lever 40 thus lifts the frame 32 until the track follower assembly 45 clears the track 46 and this position is maintained by a pivoted cog 51 resting on arm 31b, FIG. 2. The weight of cog 51 is such that when the complete assembly is topside of the pipe 47, the cog will automatically drop into the latching position on such arm. Obviously cog 51 must be released for repositioning the welding frame onto the track.

Figure 4:
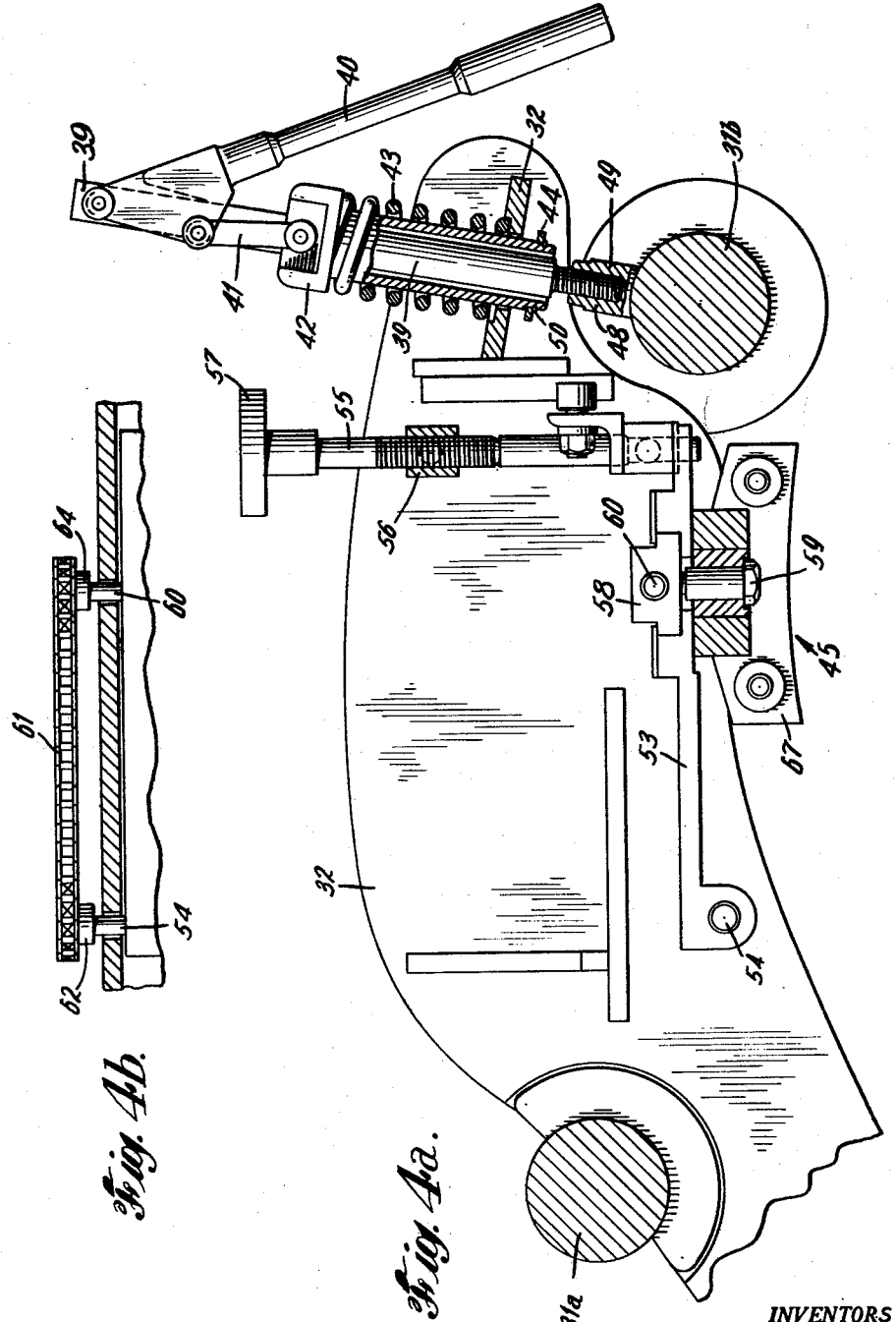
FIG. 4a is a fragmentary sectional view of the welding head frame assembly taken along line 4a—4a of FIG. 1.
FIG. 4b is a view similar to FIG. 4a of the chain drive.

Since arm 31b is flexibly connected to the frame assembly 32, the two arms need not be in perfect parallel relationship for radial float without binding. As shown in FIG. 2, torch 52 may be set at a predetermined distance from pipe 47 by preadjusting the position of the track follower assembly 45, FIG. 4a, relative to frame 32. This is accomplished by raising or lowering of a vertical float platform 53, as shown in FIG. 4a, which pivots on a shaft 54, being restrained by a threaded shaft 55 which engages pivot block 56 which, in turn, is pinned to frame 32. The lower extension of shaft 55 is similarly connected to platform 53. Hence, by suitably adjusting platform 53 through a handwheel 57, on shaft 55 the torch may be set at any desired space value within the range of limits as determined by welding requirements.

The spacial relationship between the welding torch and the seam to be welded is adjustable transversely with respect to such seam by moving the track follower 45 in FIG. 4a transversely relative to frame 32. This is accomplished by means including a cross slide 58 which is attached to platform 53 and interconnected to track follower assembly 45 through pivot stud 59. The adjusting screw 60 at cross slide 58 is made to operate by coupling it to shaft 54 via a chain 61 and sprockets 62 and 64, FIG. 4b. The end at shaft 54 is fitted to a handwheel 63, as shown in FIG. 1, to turn the drive sprocket 62 at the extension of its far end. Thus, shaft 54 acts not only as a restraining pivot for platform 53 suspended between the side member of frame 32, but also as a rotational drive shaft for the sprocket 62. Since the vertical adjustment of platform 53 is made by pivoting about shaft 54, the interconnecting chain sprockets 62 and 64 of this shaft, and the cross slide adjusting screw 60, are always in the same spatial relationship.

Figure 7:
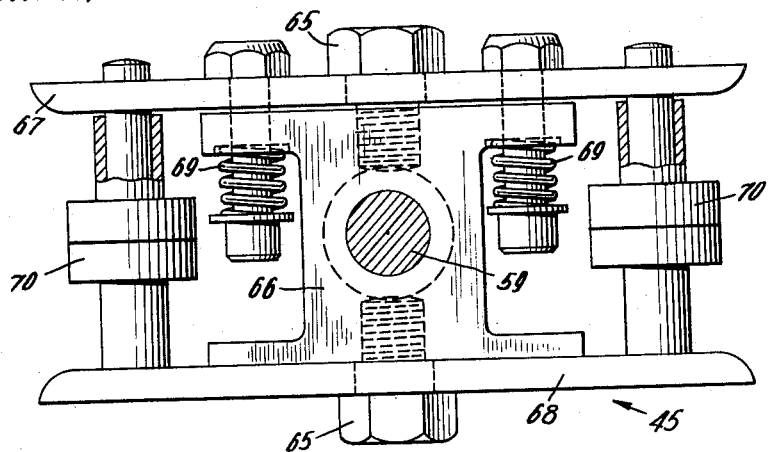
FIG. 7 is a fragmentary plan view of the track follower.
Figure 8:
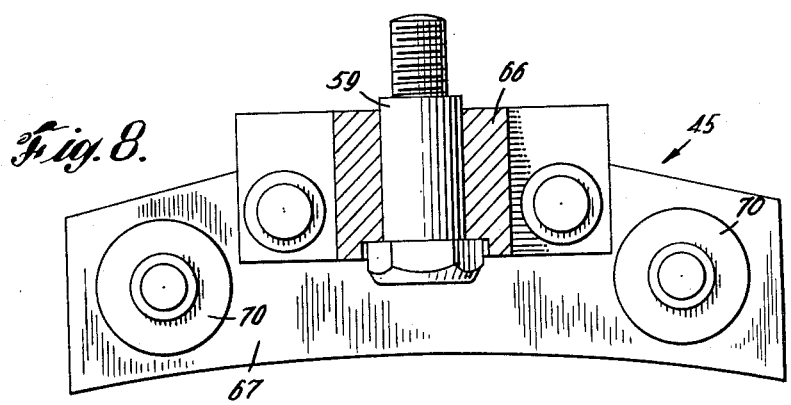
FIG. 8 is a view partly in cross-section and partly in elevation of such follower.

The carriage pilot or track follower assembly 45, as shown in FIGS. 4a, 7 and 8 is flexibly connected to cross slide 58 by means of pivot stud 59 and side studs 65. Stud 59 allows I-body 66 of the track follower assembly 45 to rotate in a plane parallel to platform 53, while studs 65 allow side plates 67 and 68 to pivot in a plane normal to platform 53. This flexibility allows the track follower assembly 45 to follow the contour of track 46 about the pipe irrespective of pipe irregularities within commercial tolerance. To facilitate alignment of track follower assembly 45 with track 46, a pin is installed through stud 59 which limits horizontal rotation of body 66 to within a few degrees of the axis of track 46.

As shown in FIG. 8, the side plate 67 is spring loaded on body 66 to compensate for any width differential of track 46. The width of body 66 is made narrower than the minimum width of track 46 so when the assembly 45 engages the track 46, the force imparted by springs 69 is of such a magnitude as to maintain intimate contact between side plates 67 and 68 and the track 46. The vertical spatial relationship to the track 46 is maintained by rollers 70 pivoted between the side plates 67 and 68.

To impart transverse motion of the welding wire-electrode E, as it passes through the torch, an oscillation mechanism capable of being adjustable within a selected range of amplitudes and frequencies is provided. This assembly enables sufficiently wide enough weld passes to be made in order to fully cover the weld seam. We have found that by modifying a simple harmonic motion cam to produce a pause in the oscillation of the welding electrode at the extreme limits of its travel, optimum weld bead uniformity is achieved and undercutting at edges of the weld is eliminated. Oscillation frequencies, of course, depend on several factors, including forward welding speed, the electrode feed rate, and oscillation amplitude, which latter depends on the width of the joint being welded. While these factors may in turn vary according to the size of the pipe, wall thickness, and particular welding condition, we have found empirically that oscillation frequencies between 70 and 150 oscillations per minute, amplitudes from 1/8 in. to 5/8 in. and dwell of 60 to 110 degrees at each end of the stroke, are suitable for the majority of pipe welding applications.

Basically, the oscillation assembly, as shown in FIG. 1, includes a governor-controlled motor-gear head 71 which drives a box-type cam 72 to produce the motion desired. The cam 72 is made to give a stroke movement with a dwell at each end of the stroke as described above. The amount of dwell is set to suit the process requirements.

The oscillator assembly is connected to the welding head 73 by a link 75 which head is pivoted in a hinge assembly 74 so that the motion imparted is in the plane of the pipe surface and transverse to the weld seam. By attaching this linkage on a radius to the cam 72, a range of adjustments in the oscillation amplitude is obtained to fully cover the process requirements.

Oscillation amplitude is adjusted by loosening handscrew 76 and resetting link 75 at a desired distance from the center of the pivot point of the welding head hinge assembly 74. Setting it closer to the pivot point of hinge 74 increases the oscillation amplitude; setting it further from the center of hinge 74 decreases the amplitude of oscillation. When adjusted, handscrew 76 is tightened to lock the mechanism in position.

The frequency of oscillation is determined by the speed of governor controlled motor 71. In an alternate embodiment of this invention, the oscillating mechanism may be made to oscillate only the torch holder and feed roll assembly, independently from the wire drive motor. In such case, the drive motor should be connected to the wire feed roll by means of universal couplings or flexible drive shaft. By so doing, the load on the oscillating mechanism is reduced, thereby permitting a lighter construction and a resultant longer wear life.

The welding head frame assembly 32 acts as a carrier for interconnecting the welding head assembly system 30 to the transport carriage 1. As a feature of the welding head frame assembly 32, means are provided for adjusting the vertical height of the torch 52 to work, as well as the transverse adjustment of the torch across the seam. This provides flexibility for all practical welding applications.

This frame, shown in FIG. 4a, is mounted upon one of the radial arms attached to the carriage transport assembly 1 (as previously described), wherein freedom to float transversely, as well as pivoting action is obtained. Here too, the welding wire spool 88 is also attached to provide a counter balancing force between the weight of the head, frame assembly, and the wire spool. The track following system is flexibly attached to the frame assembly by means of the pivot stud 59, cross slide 58, and float platform 53.

The welding head frame assembly is coupled to the second radial arm attached to the transport carriage by means of a linkage-spring arrangement to provide means for locating the track follower on the track 46 when the complete unit is placed in proper welding position upon the pipe. The linkage allows the complete welding head assembly to be located on the pipe within the float limitations without disturbing the preset guide track. Were this feature not available, it would be most difficult and time consuming to make the prewelding setup without disturbing the alignment of the track about the pipe.

A welding electrode is fed to torch 52 by an electronic governor controlled wire feed motor 87 as shown in FIGS. 1 and 2. Motor 87 drives the wire by means of feed roll assembly 84. The wire is provided from a reel contained in housing 88, which is mounted on an extension of welding head frame assembly 32. Between the wire reel and the feed assembly is an insulated tubular guide 89, FIG. 2. This guide conveys the wire to the feed roll assembly, preventing linking and insulating the wire electrically from the machine. The outlet of wire reel housing 88 is provided with means whereby the cover may be removed for inspection purposes without the necessity of cutting and restringing the wire through guide tube 89.

Figure 5:
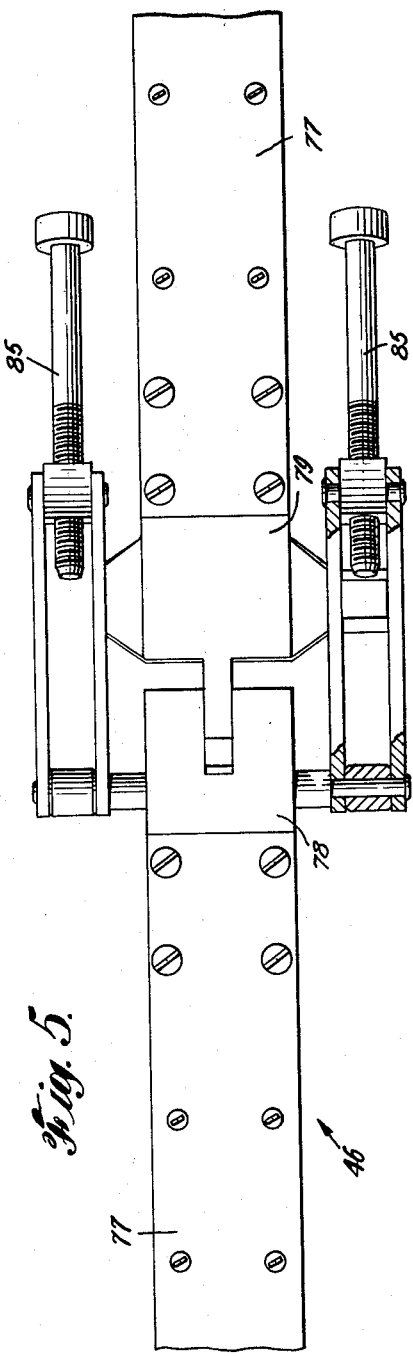
FIG. 5 is a fragmentary plan view of the track.
Figure 6:
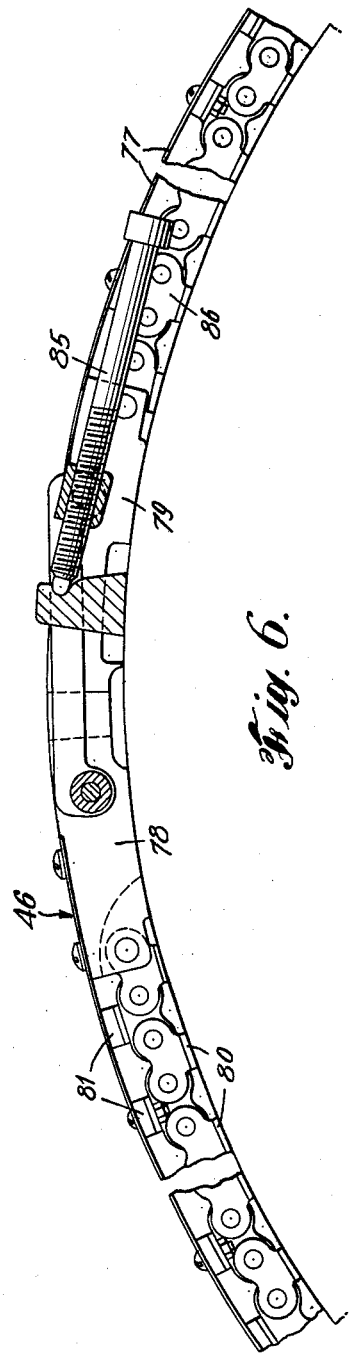
FIG. 6 is a fragmentary view in side elevation of the track.

In order to align the welding head assembly 30 with the joint about the entire circumference of the pipe, the separated flexible track 46, FIGS. 2 and 5, is first banded to the pipe at a properly gauged distance from the weld seam. After this is aligned to the seam, a set of toggle clamps 85 are used to lock the track 46 in position. Interposed between the track 46 and welding system is the track follower assembly 45 which, during welding, is always held in intimate contact with the track. This combination, namely the track together with the track follower, serves as a referencing or sensing device wherein the welding torch is maintained in alignment with the seam as the welding system traverses the pipe. Since the track 46 in itself is of a flexible construction, irregularities in the curvature of the pipe are compensated. As an example, if the pipe 47 is out of round, the track will assume the prevailing pipe contour and allow the track follower assembly 45 to guide the welding head assembly 30 accordingly. The track 46, furthermore, not only aids in tracking with respect to the transverse displacement to the weld seam, but also maintains a preselected spatial relationship between the torch and the seam.

This guiding device is provided with means wherein sufficient contact force is provided between the track follower assembly 45 and the track 46 by spring loading between the radial arm 31b and welding frame assembly 32. Consequently, lateral movement variations of the welding system are kept to a minimum in order to locate the welding torch relative to the seam within practical operating limits.

The track 46 is of a multilayer arrangement wherein the basic element which lays upon the pipe is of a roller-attachment link-type chain 86, to which is attached a thin, flexible steel strip comprising a band 77 of sufficient resiliency to permit it to assume the contour of the pipe and to be readily removable from the pipe. The ends of the steel band 77 and chain 86 are provided with interlocking tongue and groove lugs 78 and 79 so as to aid in maintaining joint alignment and compensate for variations in commercial pipe diameters. The undersides of lugs 78 and 79 are relieved at their juncture to bridge the longitudinal welded seam of the pipe in those cases where the space between the chain links is not sufficient to accomplish this function. Friction between the pipe 47 and track 46 is maintained by means of an alternating series of link feet 80 which are in intimate flat contact with the pipe 47. Similarly, alternate blocks 81 on the upper surface of the chain support the flexible band 77.

One welder and one helper operate the machine. Operating procedures for completing a butt weld in 3/8 in. thick wall overland pipe, by way of example, are described below.

Starting with the welding head aligning track 46 prepositioned on the pipe 47 in proper gauged relation to the joint to be welded, the machine is lowered onto the pipe with a suitable hoisting device. The helper simultaneously guides the machine into approximate alignment with the track. When the machine is resting on the pipe, but still supported by the hoist, the drive chains 7 are connected around both the pipe 47 and the tensioning and drive sprockets 13 and 6, and are pulled tight by the tensioning mechanism. The head is clamped to the track by means of the previously described spring loaded linkage and the track follower, and transverse adjustment is then made by means of the handwheel and cross slide to center the electrode E over the V-joints, which previously has been root welded. To facilitate positioning the electrode with respect to the joint, an electrical control circuit is provided for inching the electrode wire and for operating the torch oscillation mechanism.

The welder operates a fill-cap pass switch to produce the proper welding variable selected to produce a fill pass weld. At the same time, the amplitude of head oscillation is mechanically set for making the fill pass weld. The operator positions the machine to locate the electrode E at the 6 o'clock position at a high rate of travel. Electrical means are provided in the control unit to operate the clutches which set up the proper gear ratios to produce such high rate of travel. Electrical means are also provided for jogging the machine at some slower rate of travel to facilitate accurate positioning of the carriage on the pipe. Electrical interlocks are provided to prevent starting the welding cycle at positioning speeds.

The welding cycle is started by operating a weld start pushbutton, thereby energizing appropriate circuitry to start the functions necessary to make a satisfactory weld. Circuitry is provided to properly sequence the start of each individual function.

After the weld has progressed upwardly through approximately 120 degrees, of arc travel to 2 o'clock, the operator reduces the amount of flux delivered to the weld zone by operating a flux rate switch. Reduction of flux prevents formation of excess slag and reduces the tendency to trap slag under the molten metal which would produce a defective weld. This function can be performed automatically if so desired by employing adequate circuitry and timing devices.

Upon reaching the 12 o'clock position, the operator stops the machine and weld. The helper chips away slag while the operator advances the head (without welding) at high speed to 6 o'clock. The operator returns the flux flow to its original higher rate. The welding cycle is restarted and the second half of the fill pass is made identical to the first half by again reducing the flux flow rate after approximately 120 degrees of travel at 10 o'clock. After completion of the second half of the fill pass, the operator stops the head. The operator again advances the head at high speed without welding to 6 o'clock, and changes welding conditions to those used for making a cap pass. The helper chips flux from the start of the second half of the fill pass and increases the amplitude of torch oscillation to that required for such cap pass.

The operator advances head without welding to the 6 o'clock position at a high rate of speed, as previously described, and jogs the carriage to properly position the start of the cap pass. The starts of the fill and cap passes are staggered by several inches to prevent excessive build-up. The cap pass weld is made and the operation stopped after approximately 180 degrees of rotation. No reduction in flux rate is required when producing the cap pass. As the first half of the cap pass is being made, the operator completes chipping fused flux from the fill pass weld. The head is rapidly advanced, without welding, to the 6 o'clock position where the second half of the cap pass weld is started.

As the second half of the cap passes weld progresses, the helper removes the slag from the first half. After completion of the second half of the cap pass, the operator stops the welding cycle. The helper releases the welding head from its guide track and latches it into its transport position. The machine is hooked to the hoist and the helper releases tension from the clamping chains. As this is being done, the operator removes slag from the second half of the cap pass weld. Both operator and helper disconnect clamping chains and lift the machine from the pipe. The machine is then moved along to the next joint where another aligning track 46 has been prepositioned.

TYPICAL WELDING CONDITIONS

Fill Passes and Cap Passes

Welding current_____ 180–210 amps.
Welding voltage_____ 28–32 volts.
Welding speed_____ 9–18 i.p.m.
Flux rate_____ 60 gms./min.
                              35 gms./min. (for upper 20 degrees of each side of fill pass).
$CO_2$ Gas flow_____ 70 c.f.h.
Wire feed rate_____ 750–850 i.p.m. of 0.030 in. diameter Oxweld 43 wire.
Oscillation frequency_____ 90 oscillations/min.
Oscillation amplitude:
  3/16 in. fill passes ⎫
  3/8 in. cap passes  ⎭  3/8″ wall pipe.

The following operating sequence is preferred for welding 30 inch-diameter steel pipe having a wall thickness of 3/8 inch that is provided with a manually prepared root and hot pass in an annular 60° V-joint:

OPERATION SEQUENCE CHART—BIG INCH PIPE WELDING MACHINE—TWO PASS WELDING TECHNIQUE

|  | Weldor (Truck side) | Journeyman (Ditch side) |
|---|---|---|
| Lower to pipe | X |  |
| Rough alinement with track |  | X. |
| Connect chains | X | X. |
| Apply chain tension |  | X. |
| Clamp head on track |  | X. |
| Align torch on seam: |  |  |
|   Inch wire |  | X. |
|   Inch oscillator |  |  |
| Select fill or cap pass (SW) | X |  |
| Position to 6 o'clock (jog is necessary) | X |  |
| Weld start, 1st fill pass | X | ⎫ |
| Weld stop, 1st fill pass | X | ⎬ Remove slag. |
| Reverse travel (SW) | X | ⎭ |
| Position to 6 o'clock (jog is necessary) | X |  |
| Weld start, 2nd fill pass | X | ⎫ Remove slag |
| Weld stop, 2nd fill pass | X | ⎬ start of 2nd fill pass. |
| Reverse travel (SW) | X |  |
| Change to cap pass (SW) | X |  |
| Change oscillator amplitude |  | X. |
| Position to 6 o'clock (jog is necessary) | X |  |
| Weld start, 1st cap pass | X | ⎫ Remove slag |
| Weld stop, 1st cap pass | X | ⎭ 2nd fill pass. |
| Reverse travel (SW) | X | ⎫ Remove slag |
| Position to 6 o'clock (jog is necessary) | X | ⎭ 1st cap pass. |
| Start weld, 2nd cap pass | X | ⎫ Remove slag |
| Stop weld, 2nd cap pass | X | ⎬ start of 2nd cap pass. |
| Release head from track |  | ⎫ Remove slag ⎧ X. |
| Release chain tension |  | ⎭ 2nd cap pass. ⎨ X. |
| Disconnect chains |  | X. |
| Attach hoist and lift | X |  |
| Inspect | X | X. |

The invention thus provides a novel method of welding 1/2 in. thick wall overland pipe in three passes, or 5/16 in. to 3/8 in. thick wall pipe in two passes. In the latter case a fill pass and a cap pass are made. Each pass is made in halves starting from the 6 o'clock position and ending in the 12 o'clock position, the weld starts and ends overlapping each other slightly, while oscillating the electrode so as to fully bridge the joint.

Other important features of the invention include:

(1) The provision of a prepositioned auxiliary guide track together with a track follower which is spring loaded to eliminate backlash, to align the welding head with the seam and to maintain uniform spacial relationship between the welding torch and the joint, even compensating for irregularities in the curvature of the pipe.

(2) Means whereby the welding head can float freely on the carriage so that it is accurately positioned relative to the weld joint by the tracking system independently of the main carriage.

(3) The novel tensioning device to tighten the drive chains and maintain a positive pressure between the wheels of the carriage and the pipe.

(4) The novel means comprising pulleys, belts, and clutches which permits the drive motor to index the machine around the pipe at high speed while still providing a lower speed range for welding.

(5) The means of quickly clamping the welding head and the track follower to the guide track with a quick release mechanism.

(6) The novel means to oscillate the welding electrode transverse to the joint at selectable amplitudes and frequencies, which permits a dwell at the extremities of oscillation so as to completely bridge the joint with a uniform deposit with no undercut.

(7) The novel hook-link on a roller type chain which facilitates connecting and releasing the drive chains.

As used herein the term "sigma-flux" welding refers to that type of consumable wire electrode-arc welding, with the work-in-circuit, in which spray-type transfer of the molten metal of the electrode occurs in the welding arc which is surrounded by a stream of suitable gas, such as $CO_2$, carrying non-magnetic flux powder which fuses, leaving a light glass like slag on the weld.

What is claimed is:

1. Apparatus for circumferentially arc welding overland pipe in situ, which comprises the combination with a main carriage, means for supporting and guiding said carriage on and around such pipe in a direction substantially parallel to the joint to be welded, a motor on said carriage for driving the latter, a separate auxiliary track located annularly on the outer surface of pipe at a substantially precise distance from such joint in relation to which such track is adjusted in substantially exact parallelism, a separate welding head carriage, said track including an external annular band which assumes the same shape as that of the pipe, an arc welding torch mounted on said welding head carriage for arc welding such joint, pilot means pivoted to said welding head carriage and riding on said band for causing said track to guide the welding head carriage so that said torch always is in proper arc welding position with respect to such joint, and means connecting said carriages so that the welding head carriage is free to float longitudinally as well as radially of the pipe with respect to the main carriage while being driven in an annular direction about the pipe by said main carriage, whereby the arc welding torch is held in proper position with respect to the joint for arc welding such joint irrespective of any wobbling of the main carriage during the arc welding operation.

2. Apparatus as defined by claim 1, in which said auxiliary track comprises a link joint chain, and said band comprises a flexible steel strip overlapping said chain, interlocking groove-and-tongue lugs secured to the ends of said chain and strip, and toggle means for buckling said lugs together with said track encircling the pipe, said toggle means being adjustable for the purpose of bringing said chain into intimate contact with the outer surface of the pipe under said track, said chain being provided with means for spacing said band with the outer surface thereof radially spaced equally from the corresponding outer surface of the pipe.

3. Apparatus for circumferentially welding overland pipe in situ, which comprises the combination with a main carriage, means for supporting and guiding said carriage on and around such pipe in a direction substantially parallel to the joint to be welded, a motor on said carriage for driving the latter, a separate auxiliary track located annularly on the outer surface of pipe at a substantially precise distance from such joint in relation to which such track is adjusted in substantially exact parallelism, a separate welding head carriage, said track including an external annular band which assumes the same shape as that of the pipe, a welding torch mounted on said welding head carriage for welding such joint, pilot means pivoted to said welding head carriage and riding on said band for causing said track to guide the welding head carriage so that said torch always is in proper welding position with respect to such joint, and means connecting said carriages so that the welding head carriage is free to float longitudinally as well as radially of the pipe while being driven in an annular direction about the pipe by said main carriage, thereby maintaining the welding torch in the proper position for welding such joint at all times, said pilot means comprising a track follower assembly including a supporting stud, an I-body pivoted to said stud, side plates located on either side of said body, lateral studs supporting one of said plates for limited movement with respect to said body, compression springs on said lateral studs urging said plate toward said body yet permitting said plates to slide around the pipe with the auxiliary track, between such plates, and rollers mounted between said plates for running on the outer surface of said track as the welding head moves around the pipe, thereby to maintain the torch correctly spaced from the joint even through the pipe is out-of-round shape.

4. Apparatus for circumferentially welding overland pipe in situ, which comprises the combination with a main carriage, means for supporting and guiding said carriage on and around such pipe in a direction substantially parallel to the joint to be welded, a motor on said carriage for driving the latter, a separate auxiliary track located annularly on the outer surface of pipe at a substantially precise distance from such joint in relation to which such track is adjusted in substantially exact parallelism, a separate welding head carriage, said track including an annular external band which assumes the same shape as that of the pipe, a welding torch mounted on said welding head carriage for welding such joint, pilot means pivoted to said welding head carriage and riding on said band for causing said track to guide the welding head carriage so that said torch always is in proper welding position with respect to such joint, and means connecting said carriages so that the welding head carriage is free to float longitudinally as well as radially of the pipe while being driven in an annular direction about the pipe by said main carriage, thereby maintaining the welding torch in the proper position for welding such joint at all times, said means connecting said welding head carriage to said main carriage, comprising two float compensating parallel arm assemblies attached to one side of said main carriage, each of said assemblies including an elongated arm fixed at one end to said main carriage, a tubular sleeve mounted on said arm, ball-type roller bushings supporting said sleeve on said arm for rotary as well as axial movement with respect to said arm, and a conical telescopic spirally wound flat spring connecting the inner end of said sleeve to the side of said main carriage, said spring also spring acting to seal the inside of said assembly from the entrance of foreign matter.

5. Apparatus as defined by claim 1, in which said means for supporting and guiding said main carriage for movement about the pipe, comprises chains adapted to encircle the pipe in laterally spaced relation to each other, sprockets carried by said carriage for engaging said chains on the inner side thereof, and means for tensioning said chains to clamp said carriage on said pipe by repositioning said sprockets radially with respect to the pipe, said sprocket being connected to said motor for moving the carriage annularly with respect to the pipe.

6. Apparatus as defined by claim 1, which also include means mounted on said torch carriage for oscillating said arc welding torch transversely of the joint at a preselected amplitude and frequency, means for adjusting the extent of said amplitude, and means for also adjusting such frequency.

7. A pipe welding machine comprising the combination of a main carriage adapted to roll around the outer surface of a pipe to be welded, means for supporting said carriage in rolling contact with such pipe including a plurality of annular chains, provided with detachable end links encircling the pipe in parallel relation with one another, sprockets on said carriage meshing with the inner side of said chains, means on said carriage for shifting the axis of said sprockets to clamp the carriage on the pipe through the tension of said chains, a motor mounted on said carriage for driving said sprockets under said chains to run the carriage on such pipe, and a welding torch carried by said carriage, and separate means for guiding said torch around the pipe at a preselected radial distance from the annular surface of the pipe regardless of out-of-roundness thereof and at a preselected distance longitudinally of the pipe from an annular path parallel to the center of the joint being welded, said means comprising a pair of "float" arm assemblies extending in spaced substantially parallel relation to each other from one side of said carriage longitudinally of the pipe, a frame mounted on the free ends of said arm assemblies for supporting said welding torch with the longitudinal axis thereof located radially of such pipe, said arm assemblies comprising telescopic members permitting said frame to float horizontally, a carriage for said torch on said frame, and a track for said torch carriage comprising a band secured to said pipe, said torch carriage being guided by said track and the annular adjacent surface of the pipe as the torch is moved on such pipe by said main carriage, maintaining the torch properly positioned with respect to the joint being welded as the operation progresses, means mounted on the torch carriage for oscillating the torch transversely of the joint, means associated therewith for adjusting the amplitude and frequency of such oscillation, means mounted on said torch carriage for feeding a consumable wire electrode through said torch, and electric current means for energizing a welding arc between the end of said wire electrode and the pipe being welded.

References Cited in the file of this patent

UNITED STATES PATENTS

| | | |
|---|---|---|
| 1,810,902 | Burnish | June 23, 1931 |
| 2,013,630 | Goldsborough | Sept. 3, 1935 |
| 2,705,629 | Miller | Apr. 5, 1955 |
| 2,906,852 | Cornell et al. | Sept. 29, 1959 |
| 3,035,156 | Staley | May 15, 1962 |
| 3,063,697 | Galezniak | Nov. 13, 1962 |